Dec. 13, 1966     D. L. KLASS ET AL     3,291,155

FLUID FLOW CONTROL APPARATUS

Filed Jan. 10, 1964

INVENTORS.
DONALD L. KLASS
THOMAS W. MARTINEK
BY *Edward H. Lang*

ATTORNEY.

United States Patent Office 3,291,155
Patented Dec. 13, 1966

3,291,155
FLUID FLOW CONTROL APPARATUS
Donald L. Klass, Barrington, and Thomas W. Martinek, Crystal Lake, Ill., assignors, by mesne assignments, to Union Oil Company of California, Los Angeles, Calif., a corporation of California
Filed Jan. 10, 1964, Ser. No. 336,979
11 Claims. (Cl. 138—46)

This invention relates to an apparatus for controlling the rate of fluid flow through a conduit and, more particularly, to an apparatus using a fluid-containing drag brake to exert a drag torque on an impeller disposed in a fluid conduit to control the rate of fluid flow.

In many industrial applications it is desirable to automatically control the speed at which a fluent material e.g., a liquid obtained from a source of varying head, flows through a conduit. This invention is based on an apparatus utilizing a liquid for controlling the rate of flow of a fluent material, e.g., a liquid, a gas, etc. The apparatus of this invention includes a fluid conduit in which is disposed rotatable means for converting a part of the kinetic energy of linear or axial flow of a fluid through the conduit into rotational kinetic energy, e.g., an impeller. The impeller is mechanically connected to a rotatable member so that the rotatable member is rotatable with the impeller. The rotatable member is spaced from a stationary member and a liquid, i.e., either a dilatant liquid or a thixotropic liquid, is disposed in the space between the rotatable and stationary members so as to exert a drag torque on the impeller. For example, when a dilatant fluid is used, the shear applied to the dilatant fluid increases as the rate of fluid flow increases and the increase in shear causes an increase in viscosity, thereby exerting a drag torque on the impeller which is more than proportional to the linear flow rate of the fluid.

It is therefore an object of this invention to provide a fluid flow control device.

Another object of this invention is to provide an apparatus utilizing a liquid, i.e. a dilatant or thixotropic liquid, for controlling the rate of fluid flow through a conduit.

Still another object of this invention is to provide an apparatus for controlling the rate of fluid through a conduit wherein a drag torque is exerted on an impeller disposed in the conduit, the drag torque being proportional to the flow rate of the fluid.

These and further objects of this invention will become apparent or be described as the description thereof herein proceeds and reference is made to the accompanying drawings in which.

Figure 1:
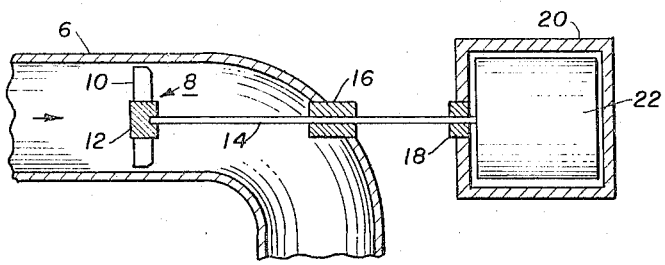
FIGURE 1 is an elevational view of an apparatus of this invention.

Referring to FIGURE 1, the reference numeral 6 designates a conduit through which a fluid is flowing in the direction indicated by the arrow. Disposed in conduit 6 is impeller (rotor) 8 having blades 10 positioned at equally spaced intervals about hub 12. Impeller 8, which is mounted on rotatable shaft 14, is so designed that it is rotated by the axial flow of fluid in conduit 6. Shaft 14 extends axially of impeller 8 and in fluid-tight relationship passes through bearing 16 in the wall of conduit 6 and bearing 18 in an end wall of non-rotatable drum 20, which is the housing of the drag brake. Axially supported on the end of shaft 14 within drum 20 is cylinder 22 which is rotatable with impeller 8. The outer surface of cylinder 22 is spaced inwardly from and concentric with drum 20 so that the opposing surfaces thereof are maintained substantially uniformly spaced from each other when cylinder 22 is rotated with respect to drum 20. Either a dilatant liquid or a thixotropic liquid is confined in the space between drum 20 and cylinder 22.

The type of liquid utilized in the drag brake will naturally depend upon the desired characteristics of the axial flow of the fluid through conduit 6. For example, a dilatant fluid is utilized when it is desired that the drag torque exerted on impeller 8 be disproportionately greater at higher flow rates of the fluid through conduit 6 than at lower flow rates. Such a system tends to be maximum-throughput-limiting. Conversely, a thixotropic fluid is utilized when the exerted torque on impeller 8 is to be disproportionately greater at low flow rates than higher flow rates. Such a system tends to be minimum-throughput-limiting.

In operation, when utilizing a dilatant fluid in the drag brake, the axial flow of a fluid in conduit 6 will impart radial motion to cylinder 22 through impeller 8 and shaft 14. Inasmuch as drum 20 is non-rotatable, the rotation of cylinder 22 will apply shear to the dilatant fluid confined between drum 20 and cylinder 22. The dilatant fluid will exhibit an increase in viscosity as a result of the applied shear, which increase in viscosity will exert a drag torque on impeller 8 to retard the axial flow of the fluid in conduit 6. The amount of the exerted drag torque will increase as the velocity of the flow of fluid in conduit 6 increases since the shear rate applied to the dilatant fluid is a function of the rotational speed of cylinder 22 with respect to drum 20.

Figure 2:
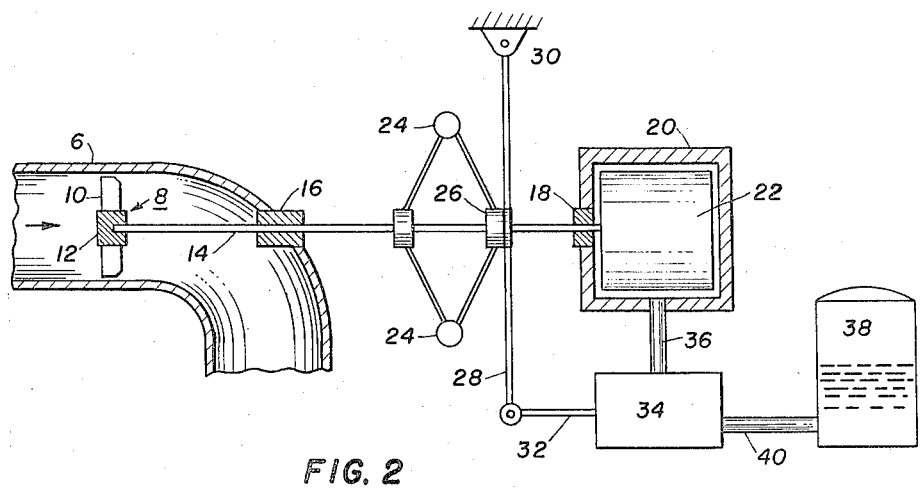
FIGURE 2 is an elevational view, partly schematic and partly in section, of an alternative embodiment of the apparatus of this invention.

The apparatus illustrated in FIGURE 2 includes an automatic control feature which can be used to provide a finer degree of control of the drag torque exerted on impeller 8, and hence a finer degree of control of the rate of fluid flow in conduit 6. Since the drag torque exerted on impeller 8 is a function of the shear-induced viscosity of the quantity of fluid confined between drum 20 and cylinder 22, the apparatus of FIGURE 2 includes means for automatically varying the amount of dilatant fluid confined between drum 20 and cylinder 22. Referring to FIGURE 2, a spring-biased governor of the usual design with fly balls 24 and slidable governor sleeve 26 is mounted on shaft 14. Rod 28 is pivotally connected to support 30 at one end and to sleeve 26 so that horizontal movement of sleeve 26, caused by a change in the centrifugal force exerted on fly balls 24 due to a change in the rotational speed of shaft 14, will result in horizontal movement of the free end of rod 28. Movement of rod 28 will in turn cause movement of control rod 32 of governor valve 34, which is pivotally attached to the free end of rod 28. Governor valve 34, which is connected to the interior of drum 20 by conduit 36 and to dilatant fluid reservoir 38 by conduit 40, includes a pump actuated by movement of control rod 32. Governor valve 34 varies the amount of control fluid introduced into the interior of drum 20 in response to movement of control rod 32. When a dilatant fluid is used as the control fluid, it will be evident that the sizes of conduits 36 and 40 must be such that the dilatant fluid can be easily passed therethrough.

The type of fluid used and the amount of fluid introduced into the interior of drum 20 by the automatic control apparatus will again depend upon the desired characteristics of fluid flow in conduit 6. For example, if a dilatant fluid is used and it is desired that the drag torque exerted on impeller 8 be proportionally greater at higher speeds than at moderate speeds, governor valve 34 is adjusted to introduce a greater amount of dilatant fluid into drum 20 as the speed of shaft 14 increases. On the other hand, the opposite type of control is achieved by reducing the amount of dilatant fluid in drum 20 as the rate of fluid flow through conduit 6 increases.

Figure 3:
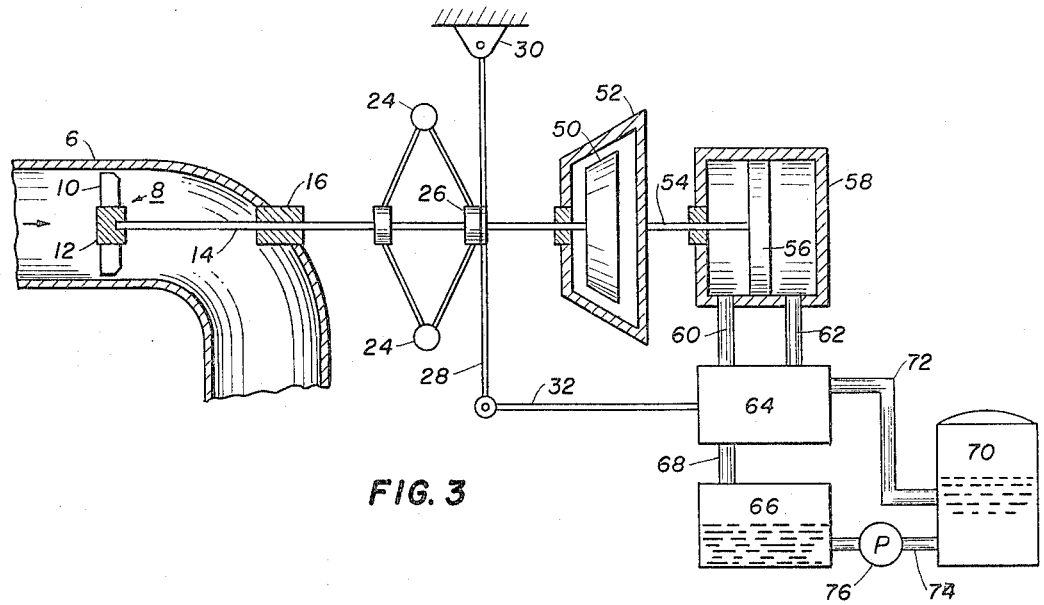
FIGURE 3 is an elevational view, partly schematic and partly in section, of still another alternative embodiment of the apparatus of this invention.

Referring to FIGURE 3, which illustrates still another alternative embodiment of the apparatus of this invention, rotatable member 50, mounted on shaft 14 so that it is rotatable with impeller 8, and non-rotatable member 52, in which fluid and rotatable member 50 are disposed, have opposing surfaces which take the form of truncated conical internal and external surfaces. Non-rotatable member 52 is axially movable with respect to rotatable member 50 to vary the space, the truncated conical internal and external surfaces, and hence to vary the amount of shear applied to the fluid confined within non-rotatable member 52. Non-rotatable member 52 is connected to an end of rod 54, the other end of which is connected to piston 56 in governor-controlled operating cylinder 58, which operates in the usual manner. The movement of piston 56 is controlled by the relative amounts of a suitable control fluid, such as an oil, introduced through conduits 60 and 62 into the two sides of operating cylinder 58, which are separated by piston 56. The relative amounts of oil in the two sides of operating cylinder 58 are controlled by governor valve 64, which is actuated by horizontal movement of control rod 32, operating in the manner described with respect to FIGURE 2. Governor valve 64, is connected to oil sump 66 by conduit 68 and to pressurized accumulating tank 70 by pressure line 72. Oil introduced into oil sump 66 through return line 68 is introduced into accumulating tank 70 through conduit 74 containing pump 76.

The direction and degree of movement of non-rotatable member 52 in response to a change in the rotational speed of impeller 8 will again depend upon the desired characteristics of the fluid flow in conduit 6. For example, in instances where it is desired that the drag torque exerted on impeller 8 be proportionally greater at higher speeds than at moderate speeds, a dilatant fluid is utilized in the apparatus and the automatic control apparatus is adjusted to move non-rotatable member 52 to decrease the space between rotatable member 50 and non-rotatable member 52 as the speed of impeller 8 is increased. The opposite control is obtained by using a dilatant fluid and adjusting the apparatus so that the distance between rotatable member 50 and non-rotatable member 52 is increased as the flow rate increases, or using a thixotropic fluid and adjusting the governor so that the distance between the shearing surfaces of the drag brake is decreased as the rate of flow in conduit 6 increases.

The compositions of the utilized fluids in the apparatus of this invention form no part of the invention and the fluids may be either liquid or semi-solid, e.g., grease-type compositions. Examples of thixotropic fluids are gels of $Fe(OH)_3$ or $Al(OH)_3$, sols of iron oxide or vanadium oxide, silica gel, certain asphalts or asphaltic bitumens, clays, gelatine, greases, carbon black suspensions, etc. Examples of dilatant fluids, in addition to that set forth below, are sucrose solutions, aqueous pastes of quartz or starch, kaolin, cornstarch, feldspar pastes, etc. The following composition is set forth as an example of a particularly suitable dilatant fluid which may be utilized:

| | Wt. percent |
|---|---|
| Particulate silica (1–2 microns particle size containing combined water in an amount of about 6 silanol groups per square millimicron of surface area) | 50.56 |
| 2-hydroxyethyl-1-heptadecenyl immazoline | 10.11 |
| Glycerol monooleate | 5.56 |
| Ethylene glycol | 4.04 |
| Mineral oil (80 SUS at 100° F.) | 29.73 |

Although this invention has been described in relation to specific embodiments, it will be apparent that various modifications may be made by one skilled in the art without departing from the intended scope of this invention. For example, the rotatable member which is rotatable with the impeller and the non-rotatable member spaced from the rotatable member may be opposing disks disposed in a housing for confining a suitable fluid. Other modifications of automatic control features may be used, as for example, an electrical linkage may be used between the governor sleeve and the governor valve. The governor of the embodiments of FIGURES 2 and 3 may be mounted on a second shaft, which is mechanically connected to a second rotor disposed in the conduit, instead of on the shaft connecting the drag brake to the rotor for controlling the fluid flow, so that there are separate rotors in the conduit for sensing and controlling the rate of fluid flow.

The embodiments of the invention in which an exclusive property or privilege is claimed are defined as follows:

1. An apparatus for controlling the rate of fluid flow through a conduit comprising a conduit for confining a fluid under flow, rotor means disposed in said conduit for rotation by the axial flow of a fluid through said conduit and a drag brake including a rotatable member and a non-rotatable member having spaced, opposing surfaces between which a liquid from the group consisting of a dilatant liquid and a thixotropic liquid is confined, said rotatable member being mechanically connected to said rotor means such that the rotation of said rotor means results in the rotation of said rotatable member with respect to said non-rotatable member to shear the confined liquid, whereby the shearing of said liquid exerts a drag torque on said rotor means.

2. An apparatus in accordance with claim 1 in which said liquid is a dilatant liquid.

3. An apparatus in accordance with claim 1 in which said liquid is a thixotropic liquid.

4. An apparatus for controlling the rate of fluid flow through a conduit comprising a conduit for confining a fluid under flow, rotor means disposed in said conduit for rotation by the axial flow of a fluid through said conduit and a drag brake including a rotatable member and a non-rotatable member having spaced, opposing surfaces between which a liquid is confined, said rotatable member being mechanically connected to said rotor means such that the rotation of said rotor means results in the rotation of said rotatable member with respect to said non-rotatable member to shear the confined liquid, whereby the shearing of said liquid exerts a drag torque on said rotor means, and regulating means for varying the drag torque imposed on said rotor means by the shearing of said confined liquid.

5. An apparatus for controlling the rate of fluid flow through a conduit comprising a conduit for confining a fluid under flow, rotor means disposed in said conduit for rotation by the axial flow of a fluid through said conduit and a drag brake including a rotatable member and a non-rotatable member having spaced, opposing surfaces between which a liquid is confined, said rotatable member being mechanically connected to said rotor means such that the rotation of said rotor means results in the rotation of said rotatable member with respect to said non-rotatable member to shear the confined liquid, whereby the shearing of said liquid exerts a drag torque on said rotor means, said non-rotatable and rotatable members having opposing cylindrical surfaces.

6. An apparatus in accordance with claim 4 in which said regulating means is responsive to the rotational speed of said rotor means.

7. An apparatus in accordance with claim 6 in which said regulating means varies the amount of liquid confined between said non-rotatable and rotatable members.

8. An apparatus in accordance with claim 6 in which said regulating means varies the distance between said rotatable and non-rotatable members.

9. An apparatus in accordance with claim 8 in which said regulating means is adapted to axially move said non-rotatable member with respect to said rotatable member in response to the rotational speed of said rotor means.

10. An apparatus in accordance with claim 9 in which the said non-rotatable and rotatable members have truncated internal and external conical opposing surfaces.

11. An apparatus in accordance with claim 5 in which the said non-rotatable member is a hollow cylinder and said rotatable member is a cylindrical body disposed within said non-rotatable member and having an outer surface spaced inwardly from and concentric with said non-rotatable member to form an annular space therebetween.

References Cited by the Examiner
UNITED STATES PATENTS

| | | | |
|---|---|---|---|
| 1,870,849 | 8/1932 | Hodgson | 138—37 X |
| 2,121,482 | 6/1938 | Freed | 138—37 X |
| 2,756,016 | 7/1956 | Painter | 188—100 |

OTHER REFERENCES

Spooner, L. W.: Silicone Putty as an Engineering Material, in Product Engineering, January 1950, pp. 90–93.

LAVERNE D. GEIGER, *Primary Examiner.*

C. HOUCK, *Assistant Examiner.*